United States Patent
Kinoshita

(10) Patent No.: US 9,891,317 B2
(45) Date of Patent: Feb. 13, 2018

(54) VOLTAGE DROP PROTECTION APPARATUS, TRANSMISSION DEVICE, AND VOLTAGE DROP PROTECTION SYSTEM

(71) Applicant: Furuno Electric Co., Ltd., Nishinomiya (JP)

(72) Inventor: Yohei Kinoshita, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 652 days.

(21) Appl. No.: 14/549,378

(22) Filed: Nov. 20, 2014

(65) Prior Publication Data

US 2015/0138922 A1    May 21, 2015

(30) Foreign Application Priority Data

Nov. 21, 2013 (JP) .................. 2013-240887

(51) Int. Cl.
| | |
|---|---|
| G01S 15/96 | (2006.01) |
| H02J 9/04 | (2006.01) |
| G01S 7/52 | (2006.01) |
| H02H 3/24 | (2006.01) |

(52) U.S. Cl.
CPC .............. *G01S 15/96* (2013.01); *G01S 7/52* (2013.01); *H02H 3/243* (2013.01); *H02J 9/04* (2013.01)

(58) Field of Classification Search
CPC . G01S 15/96; G01S 7/52; H02H 3/243; H02J 9/04
See application file for complete search history.

(56) References Cited

U.S. PATENT DOCUMENTS

2005/0264268 A1* 12/2005 Ueno .................. H02J 7/0065
323/211

FOREIGN PATENT DOCUMENTS

| JP | 58198116 A | 11/1983 |
|---|---|---|
| JP | H07219683 A | 8/1995 |
| JP | 2000116029 A | 4/2000 |
| JP | 2003294832 A | 10/2003 |
| JP | 2004056909 A | 2/2004 |
| JP | 2004260887 A | 9/2004 |
| JP | 2010239850 A | 10/2010 |

* cited by examiner

*Primary Examiner* — Scott Bauer
(74) *Attorney, Agent, or Firm* — Alleman Hall Creasman & Tuttle LLP

(57) ABSTRACT

A voltage drop protection apparatus is provided. The voltage drop protection apparatus includes a power source, a controller electrically connected with the power source and configured to control electronic device by using a power supplied from the power source, a transmission capacitor electrically connected with the power source and configured to accumulate a transmission power to be used when transmitting either one of an electromagnetic wave and a sound wave, and a voltage detector configured to detect a value of voltage applied from the power source toward the electronic device. When the voltage value detected by the voltage detector is lower than a predetermined threshold, the transmission capacitor applies the voltage at least to the controller.

10 Claims, 7 Drawing Sheets

VOLTAGE DROP PROTECTION APPARATUS, TRANSMISSION DEVICE, AND VOLTAGE DROP PROTECTION SYSTEM

CROSS-REFERENCE TO RELATED APPLICATION(S)

This application claims priority under 35 U.S.C. § 119 to Japanese Patent Application No. 2013-240887, which was filed on Nov. 21, 2013, the entire disclosure of which is hereby incorporated by reference.

TECHNICAL FIELD

This disclosure generally relates to a voltage drop protection apparatus, which prevents a power source from being turned off, by applying voltage at least to a controller when instantaneous voltage drop occurs.

BACKGROUND OF THE INVENTION

Conventionally, cases in which voltage to be applied from a power source drops or is not applied due to lighting or the like (instantaneous voltage drop) have been known. Particularly, with ships, there is a case where such instantaneous voltage drop occurs when an engine is turned on because a current instantly concentrates on a starter motor of the engine, and voltage is temporarily not applied to other electric components. The instantaneous voltage drop may also occur when the power source is switched from a ground power source into a power source in the ship (e.g., a battery connected to the engine). JP2000-116029A and JP1983-198116A disclose configurations of power source units in which voltage for electric components are maintained even when instantaneous voltage drop occurs.

JP2000-116029A discloses a backup power source unit including a backup battery in addition to an AC power source for normal use. With the backup power source unit, in a case of blackout, the battery applies voltage to electric components instead of the AC power source.

JP1983-198116A discloses a ship power source unit including a generator and various circuits that adjust an output voltage of the generator. The various circuits include an inverse conversion circuit that receives a predetermined gate signal and generates an alternation voltage. With the ship power source unit, when the output voltage of the generator is stopped, a capacitor disposed near the inverse conversion circuit supplies the gate signal to the inverse conversion circuit, instead of the generator.

However, since the battery in JP2000-116029A is only for backup, the battery needs to be disposed in addition to the normal power source unit. In this case, the size of the backup power source unit becomes large and the component cost increases. Moreover, since the capacitor in JP1983-198116A is also only for backup, it has similar problems.

SUMMARY OF THE INVENTION

The purpose of this disclosure relates to providing a voltage drop protection apparatus, which applies voltage to an electric component when instantaneous voltage drop occurs, without a dedicated backup power source.

According to a first aspect of this disclosure, a voltage drop protection apparatus with the following configuration is provided. That is, the voltage drop protection apparatus includes a power source, a controller, a transmission capacitor, and a voltage detector. The controller is electrically connected with the power source and controls electronic device by using a power supplied from the power source. The transmission capacitor is electrically connected with the power source and accumulates a transmission power to be used when transmitting either one of an electromagnetic wave and a sound wave. The voltage detector detects a value of voltage applied from the power source toward the electronic device. When the voltage value detected by the voltage detector is lower than a predetermined threshold, the transmission capacitor applies the voltage at least to the controller.

Since an accumulable energy amount of the transmission capacitor is generally large, by using the transmission capacitor as a backup power source, the voltage can be efficiently applied to the controller even when instantaneous voltage drop occurs. Further, compared to the configuration provided with the dedicated backup power source, the size of the apparatus and the component cost thereof can be reduced. Furthermore, since the voltage for the controller which is an important component can be maintained, a transmission device, such as a fish finder, can be continued to be used after restoring from the instantaneous voltage drop.

With the voltage drop protection apparatus, the controller is preferred to be installed with an operating system.

Thereby, the voltage for the controller which requires a long period of time to activate can be maintained, and thus, the transmission device, such as the fish finder, can be continued to be used after restoring from the instantaneous voltage drop.

With The voltage drop protection apparatus, the power source is preferred to also supply the power to a display unit configured to display an image. When the voltage value detected by the voltage detector is lower than the predetermined threshold, the transmission capacitor is preferred not to apply the voltage to the display unit.

Generally, even when the display unit is turned off due to the instantaneous voltage drop, the display unit can instantly become usable by being applied the voltage again. Therefore, by applying the voltage to the controller, instead of to the display unit, the transmission device, such as the fish finder, can be continued to be used after restoring from the instantaneous voltage drop.

With the voltage drop protection apparatus, after the voltage value lower than the predetermined threshold is detected by the voltage detector, when the voltage value is detected by the voltage detector again and the detected voltage value is higher than the predetermined threshold, the application of the voltage from the transmission capacitor to the controller is preferred to be stopped.

Thereby, after restoring from the instantaneous voltage drop, the voltage drop protection apparatus can perform restoring automatically.

According to a second aspect of this disclosure, a transmission device with the following configuration is provided. That is, the transmission device includes a transmitter, a controller, and a voltage detector. The transmitter transmits either one of an electromagnetic wave and a sound wave outside and includes a transmission capacitor. The controller controls at least the transmitter by using power supplied from a power source. The voltage detector detects a value of voltage applied from the power source. When the voltage value detected by the voltage detector is lower than a predetermined threshold, the transmission capacitor applies the voltage to the controller.

Thus, by using the transmission capacitor as the backup power source, the size of the device and the component cost thereof can be reduced compared to the configuration provided with the dedicated backup power source.

The transmission device is preferred to have the following configuration. That is, the transmission device includes an insulated DC-to-DC converter electrically connected with the power source, and a non-insulated DC-to-DC converter electrically connected with the controller.

Thus, the number of the insulated DC-to-DC converter which is expensive can be suppressed to only one, therefore, the component cost can be reduced.

According to a third aspect of this disclosure, a voltage drop protection system with the following configuration is provided. That is, the voltage drop protection system includes a power source and a fish finder. The fish finder includes a transmitter, controller, and a voltage detector. The transmitter transmits a sound wave underwater and includes a transmission capacitor. The controller controls at least the transmitter by using power supplied from the power source. The voltage detector detects a value of voltage applied from the power source to the fish finder. When the voltage value detected by the voltage detector is lower than a predetermined threshold, the transmission capacitor applies the voltage to the controller.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
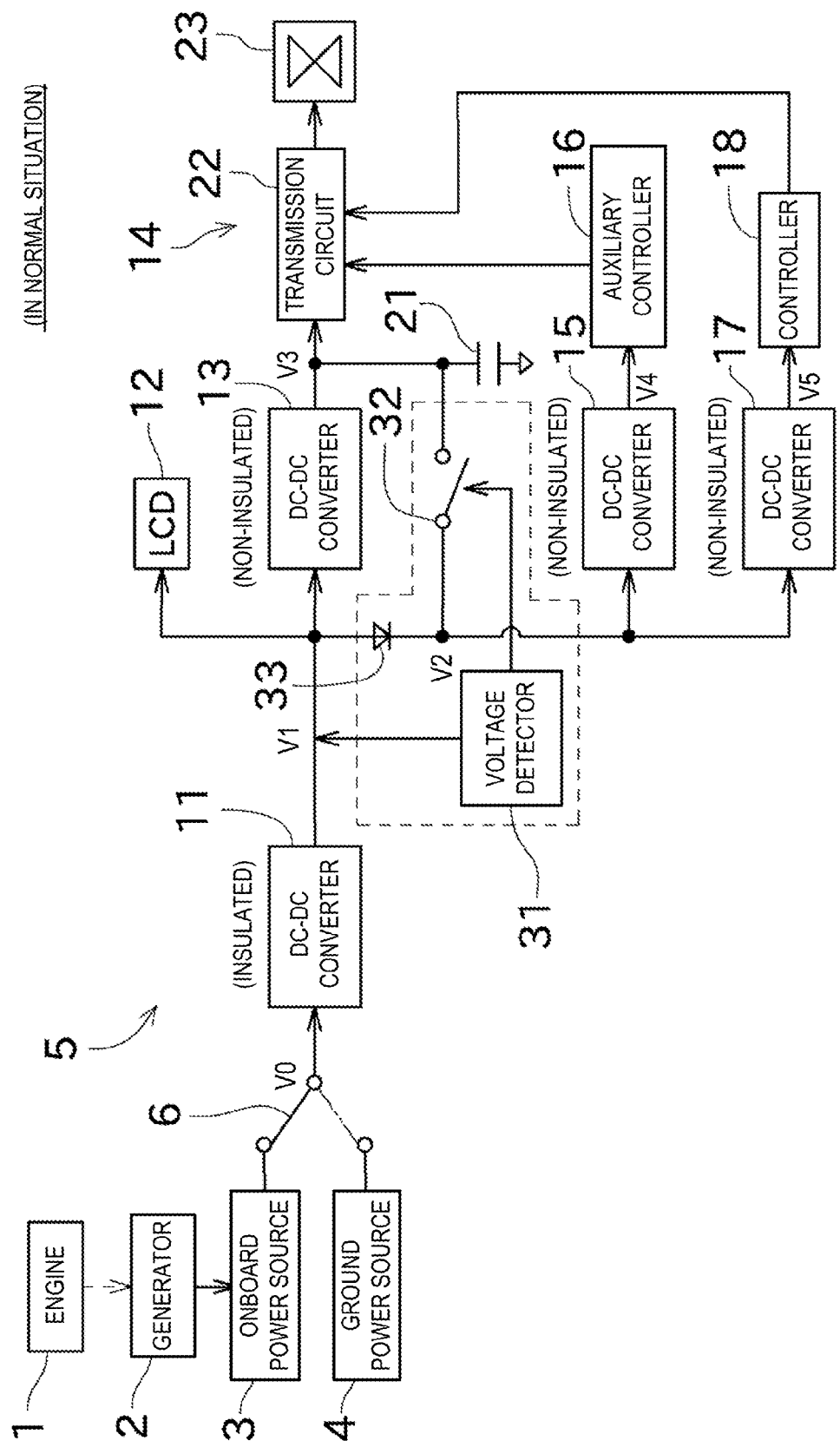
FIG. 1 is a block diagram illustrating a power source configuration inside a ship (in a normal situation) according to one embodiment of this disclosure.

Next, one embodiment of this disclosure is described with reference to the appended drawings. FIG. 1 is a block diagram illustrating a power source configuration inside a ship (in a normal situation) according to one embodiment of this disclosure.

An onboard power source 3 and a ground power source 4 (hereinafter, may collectively be referred to as the power source) supply electric power to a fish finder 5 (ship electronic device, transmission device) and other ship electronic devices (not illustrated). The onboard power source 3 of this embodiment is provided in the ship (hereinafter, may be referred to as "the ship concerned" or simply as "the ship") and is a capacitor that accumulates electric power generated by a generator 2. The generator 2 generates the electric power by using drive power generated by an engine 1. The onboard power source 3 supplies the electric power to the ship electronic device, such as the fish finder 5. Moreover, the ground power source 4 is a power source provided on land and supplies electric power to electronic devices, such as the ship electronic devices installed in the ship, when the ship is anchored. The onboard power source 3 and the ground power source 4 are switched therebetween by a switch 6.

Hereinafter, a configuration of the fish finder 5 is described and processing of applying voltage to respective components of the fish finder 5 by either one of the onboard power source 3 and the ground power source 4 is described.

The fish finder 5 transmits ultrasonic waves underwater, receives reflection waves caused by the ultrasonic waves, and analyzes them, to create data indicating a position of school of fish and the like. The fish finder 5 of this embodiment includes an LCD 12 (Liquid Crystal Display, display unit), a transmitter 14, an auxiliary controller 16, and a controller 18.

Moreover, the fish finder 5 includes four DC-to-DC converters 11, 13, 15 and 17. The DC-to-DC converter 11 is insulated, and the DC-to-DC converters 13, 15 and 17 are not insulated. Among the four DC-to-DC converters, the DC-to-DC converter 13 has a highest output voltage, the DC-to-DC converter 11 has a second highest output voltage, the DC-to-DC converter 15 has a third highest output voltage, and the DC-to-DC converter 17 has a lowest output voltage.

The LCD 12 is electrically connected with the onboard power source 3 via the DC-to-DC converter 11. Moreover, the LCD 12 is connected with the controller 18 and displays school-of-fish data created by a receiver (not illustrated) based on the reflection waves. The LCD 12 does not activate complicating programs when it is turned on, and thus, the LCD 12 can instantly display an image after restoring from instantaneous voltage drop. Note that, the display unit is not limited to the LCD, and any other display having a different display principal, such as an organic EL display or a plasma display, may be used.

The transmitter 14 generates ultrasonic waves having a predetermined waveform and transmits them underwater. The transmitter 14 is electrically connected with the onboard power source 3 via the DC-to-DC converters 11 and 13. The DC-to-DC converter 13 increases the voltage supplied from the DC-to-DC converter 11. Moreover, the transmitter 14 includes a transmission capacitor 21, a transmission circuit 22, and an oscillator 23.

The transmission capacitor 21 accumulates electrical charge. The transmission circuit 22 generates the ultrasonic waves having the predetermined waveform and transmits them underwater from the oscillator 23 at predetermined timings. The transmission circuit 22 is controlled by the controller 18 to set the ultrasonic waveform and/or the transmission timing, etc. Note that, the transmission capacitor 21 is provided so as to transmit the ultrasonic wave with a predetermined intensity from the start of the transmission. Therefore, generally, a capacitor provided to a transmitter of a fish finder has a large capacity and an accumulable energy amount thereof is large. Note that, although a capacitor provided to a transmitter of a radar apparatus generally has a small capacity, since its transmission voltage is high, the accumulable energy amount is large.

Each of the auxiliary controller 16 and the controller 18 includes a CPU (Central Processing Unit) and controls the respective components of the fish finder 5. The auxiliary controller 16 receives voltage reduced by the DC-to-DC converter 15. The controller 18 receives voltage reduced by the DC-to-DC converter 17. The controller 18 mainly controls the fish finder 5, and the auxiliary controller 16 assists the controller 18 to perform the control. Each of the auxiliary controller 16 and the controller 18 is installed with an OS (Operating System) and, thus, cannot exert its function until the OS is activated even after restoring from the instantaneous voltage drop.

Moreover, as illustrated in FIG. 1, the fish finder 5 includes a voltage detector 31, a switch 32, and a diode 33. The voltage detector 31, the switch 32, and the diode 33 are not provided to a conventional fish finder 5x as illustrated in FIG. 2, and they are a characteristic configuration of this embodiment.

Hereinafter, problems that arise with the conventional fish finder 5x which does not include the voltage detector 31 and the like are described, and it is also described that those problems can be solved by the voltage detector 31 and the like of this embodiment.

Figure 2:
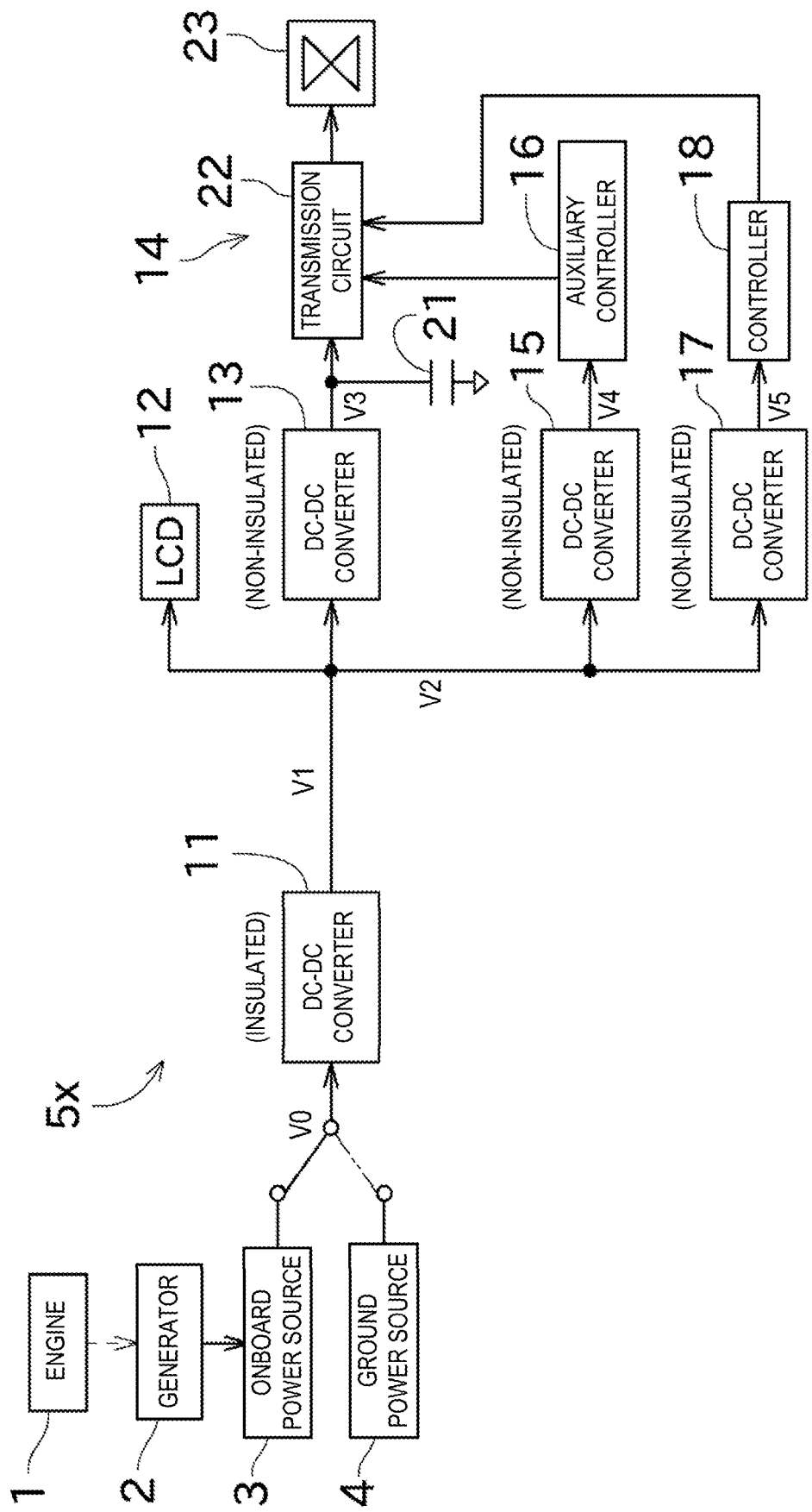
FIG. 2 is a block diagram illustrating a power source configuration inside a ship according to a conventional example.

The fish finder 5x in FIG. 2 is the same as the fish finder 5 of this embodiment, except that the voltage detector 31 and the like are not provided. Here, a case where the instantaneous voltage drop occurs due to switching the power source to be used from the ground power source 4 to the onboard power source 3 is described with reference to FIGS. 3A to 3F. FIGS. 3A to 3F are charts illustrating transition of voltage values V0 to V5 at respective locations.

Figure 3A:
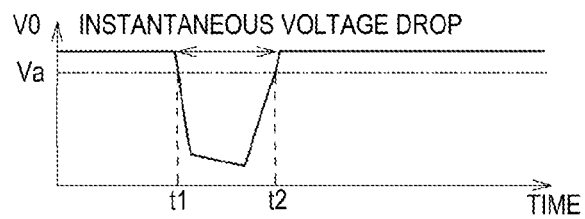
FIG. 3A to FIG. 3F are charts illustrating transition of voltage values at respective locations according to the conventional example.
Figure 3B:
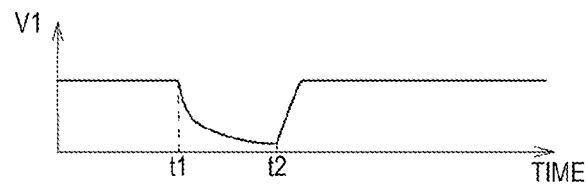
Figure 3C:
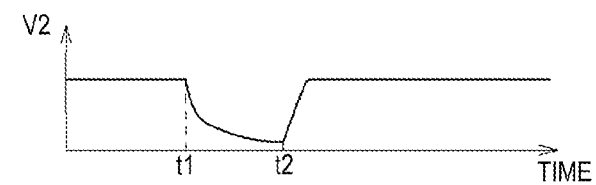
Figure 3D:
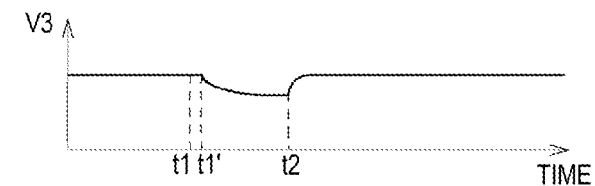
Figure 3E:
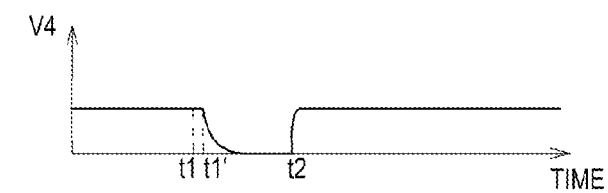
Figure 3F:
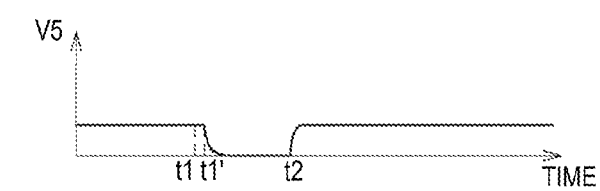

When the instantaneous voltage drop occurs, as illustrated in FIG. 3A, the voltage value (V0) of the power source significantly decreases. Note that, in this embodiment, the instantaneous voltage drop indicates a drop of the voltage value V0 to Va or lower, between timings t1 and t2. Due to the instantaneous voltage drop, as illustrated in FIGS. 3B to 3F, the voltage values for the respective components of the fish finder 5 also gradually decreases. Note that, the DC-to-DC converter 11 is provided with a low-voltage protective function; therefore, the voltage values (V3, V4 and V5) to be supplied to the transmitter 14, the auxiliary controller 16, and the controller 18 are kept at a certain level for a while (between timings t1 and t1'), and then the voltage values decrease as illustrated in FIGS. 3D to 3F.

Here, as illustrated in FIG. 3D, since the capacity of the capacitor is large and the load thereof is low, the voltage value for the transmitter 14 does not becomes zero even when it decreases. On the other hand, as illustrated in FIGS. 3E and 3F, since the capacity of the capacitor for the auxiliary controller 16 and the controller 18 is small and the load thereof is high, when the voltage values for the auxiliary controller 16 and the controller 18 decrease, they become zero.

Thus, the voltage is not applied to the auxiliary controller 16 and the controller 18, and as a result, the auxiliary controller 16 and the controller 18 are turned off and cannot exert their functions. Then, even after restoring from the instantaneous voltage drop after the timing t2, the auxiliary controller 16 and the controller 18 cannot exert their functions until the respective OSs are activated, and therefore, time lag occurs for an operator to be able to use the fish finder 5.

Next, the configuration of this embodiment in which the voltage detector 31 and the like are provided to prevent the auxiliary controller 16 and the controller 18 from being turned off, is described. First, the voltage detector 31, the switch 32, and the diode 33 are described.

The voltage detector 31 detects the output voltage value (V1) of the DC-to-DC converter 11. The switch 32 is provided in the circuit connecting the transmission capacitor 21 with the DC-to-DC converters 15 and 17. The diode 33 allows current from the transmission capacitor 21 to only pass between the auxiliary controller 16 and the controller 18 and does not allow the current to pass to the LCD 12 side. Note that, alternative to the diode 33, a switch having a similar function, an FET or the like may be used.

Figure 4:
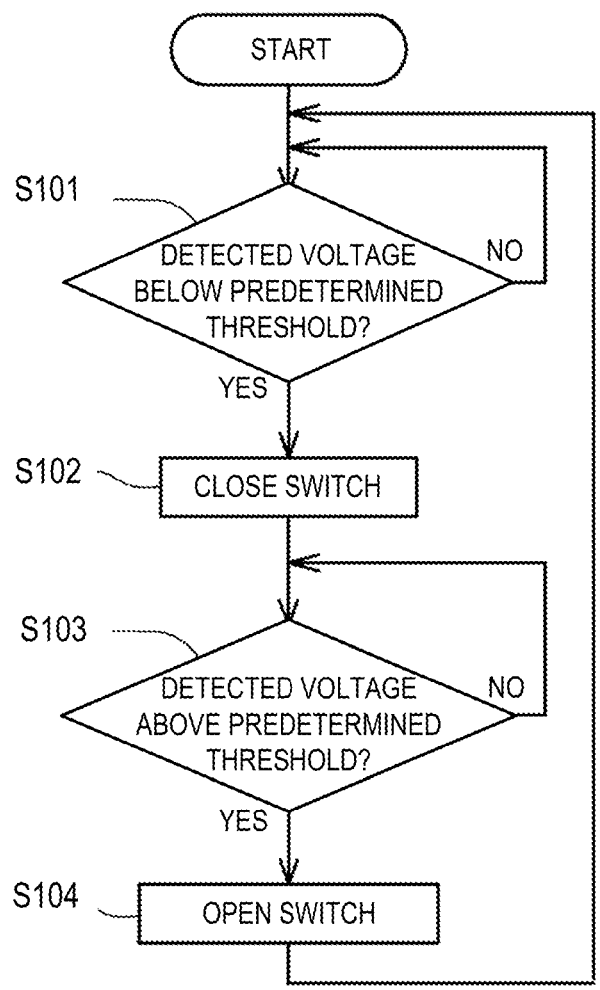
FIG. 4 is a flowchart illustrating a control performed by a voltage detector in the embodiment.
Figure 5:
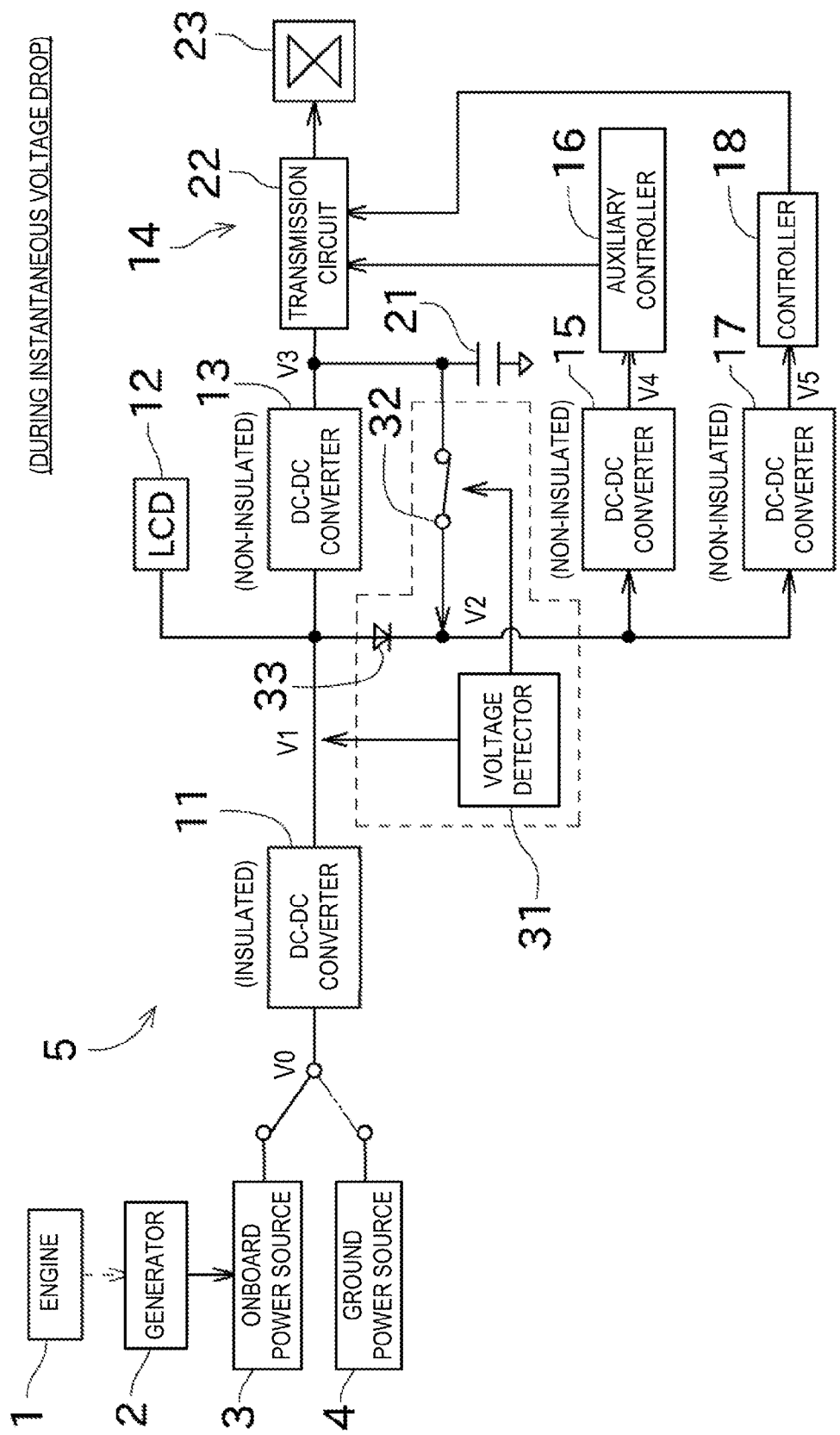
FIG. 5 is a block diagram illustrating a power source configuration inside a ship (during instantaneous voltage drop) according to the embodiment.

Moreover, the voltage detector 31 performs processing illustrated in FIG. 4. Specifically, the voltage detector 31 determines whether the detected voltage value is lower than a predetermined threshold (S101), and if the detected voltage value is determined to be lower than the predetermined threshold, the voltage detector 31 closes the switch 32 (S102). Thereby, the circuit of the fish finder 5 is changed to a state of FIG. 5.

Here, the predetermined threshold is set such that the occurrence of the instantaneous voltage drop can be detected. The threshold needs to be smaller than a value that definitely causes error detection, but is preferably not excessively small so that the controller 18 receives the voltage before the controller 18 is turned off.

The voltage detector 31 continues to detect the voltage value even after the switch 32 is closed at S102, and determines whether the detected voltage value is higher than the predetermined threshold (S103). If the detected voltage value is determined to be higher than the predetermined threshold, the voltage detector 31 opens the switch 32 (S104). Thereby, the circuit of the fish finder 5 returns to the state of FIG. 1.

Figure 6A:
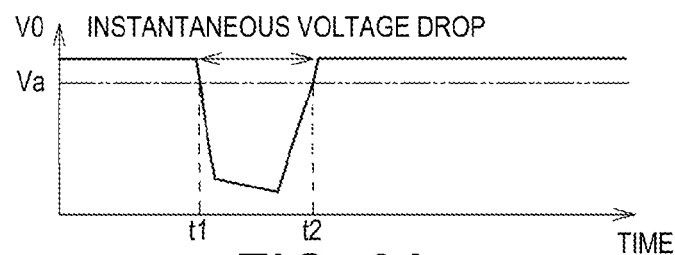
FIG. 6A to FIG. 6F are charts illustrating transition of voltage values at respective locations according to the embodiment.
Figure 6B:
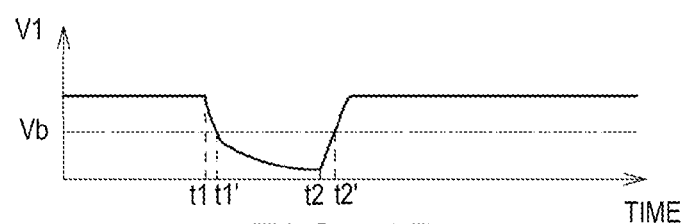
Figure 6C:
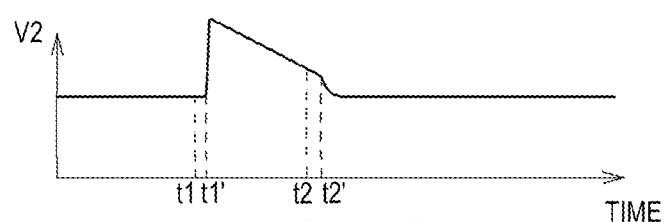
Figure 6D:
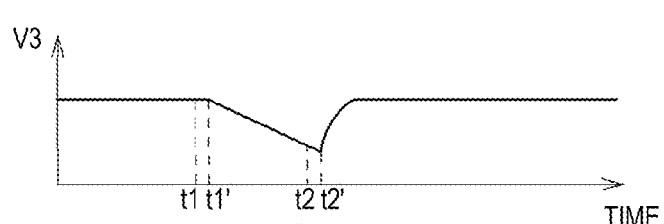

Next, voltage value transition at the respective locations when the instantaneous voltage drop occurs in this embodiment is described with reference to FIGS. 5 and 6A to 6F. When the instantaneous voltage drop occurs, similar to the conventional example, the voltage value (V0) significantly decreases as illustrated in FIG. 6A. Accordingly, the voltage values for the respective components of the fish finder 5 also gradually decreases. Thus, as illustrated in FIG. 6B, when the voltage value (V1) detected by the voltage detector 31 is lower than the threshold (Vb), the switch 32 is closed and the circuit of the fish finder 5 is changed from the state of FIG. 1 to the state of FIG. 5.

Thus, the voltage is applied from the transmission capacitor 21 side where the voltage is higher, to the auxiliary controller 16 side and the controller 18 side where the voltage is lower. The applied voltage is reduced by either one of the DC-to-DC converter 15 and the DC-to-DC converter 17. Note that, the voltage is not applied to the LCD 12 due to the influence of the diode 33.

Figure 6E:
Figure 6F:
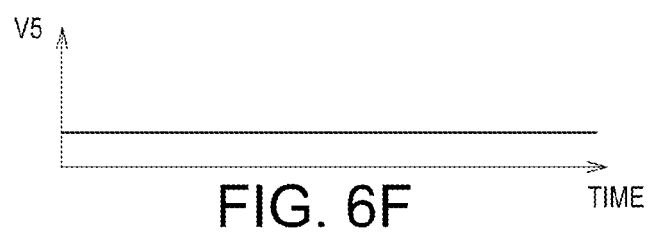

Thus, as illustrated in FIGS. 6E and 6F, the values of the voltage to be applied to each of the auxiliary controller 16 and the controller 18 is basically always fixed, and the auxiliary controller 16 and the controller 18 are not turned off. Note that, although the transmission capacitor 21 does not apply the voltage to the LCD 12, this does not cause much influence on the LCD 12 since the LCD 12 does not require a long period of time to activate. Actually, the voltage not being applied to the LCD 12 is advantageous since the LCD 12 can respond to a case where the instantaneous voltage drop lasts for a longer period of time than usual.

Then, at the timing t2, the fish finder 5 restores from the instantaneous voltage drop and the normal voltage is supplied from either one of the onboard power source 3 and the ground power source 4 to the DC-to-DC converter 11 again. Thus, the value of the voltage outputted by the DC-to-DC converter 11 (i.e., the voltage value (V1) detected by the voltage detector 31) increases and, at a timing t2', exceeds the threshold (Vb). The switch 32 is opened once the voltage value (V1) detected by the voltage detector 31 exceeds the threshold (Vb). Thus, the voltage application from the transmission capacitor 21 side to the auxiliary controller 16 side and the controller 18 side is stopped. Thereby, the fish finder 5 can be operated based on the power source again.

As above, the transmission capacitor 21 constitutes a part of the transmitter 14 and also functions as a backup power source. Therefore, in this embodiment, the power source (at least one of the onboard power source 3 and the ground power source 4), the transmission capacitor 21, the voltage detector 31, and the switch 32 correspond to a voltage drop protection apparatus.

As described above, the voltage drop protection apparatus includes the power source (at least one of the onboard power source 3 and the ground power source 4), the auxiliary controller 16, the controller 18, the voltage detector 31, and the transmission capacitor 21. The auxiliary controller 16 and the controller 18 are electrically connected with the power source and control the fish finder 5 by using the power supplied from the power source. The voltage detector 31 detects the value of the voltage applied from the power source toward the fish finder 5. The transmission capacitor 21 is electrically connected with the transmission circuit 22 that transmits sound waves outside. When the voltage value detected by the voltage detector 31 is lower than the predetermined threshold, the voltage is applied from the transmission capacitor 21 to the auxiliary controller 16 and the controller 18.

Therefore, the voltage can be applied to the controller 18 and the like even during the instantaneous voltage drop. Moreover, compared to the configuration provided with a dedicated backup power source, the size of voltage drop protection apparatus and the component cost thereof can be reduced.

Figure 7:
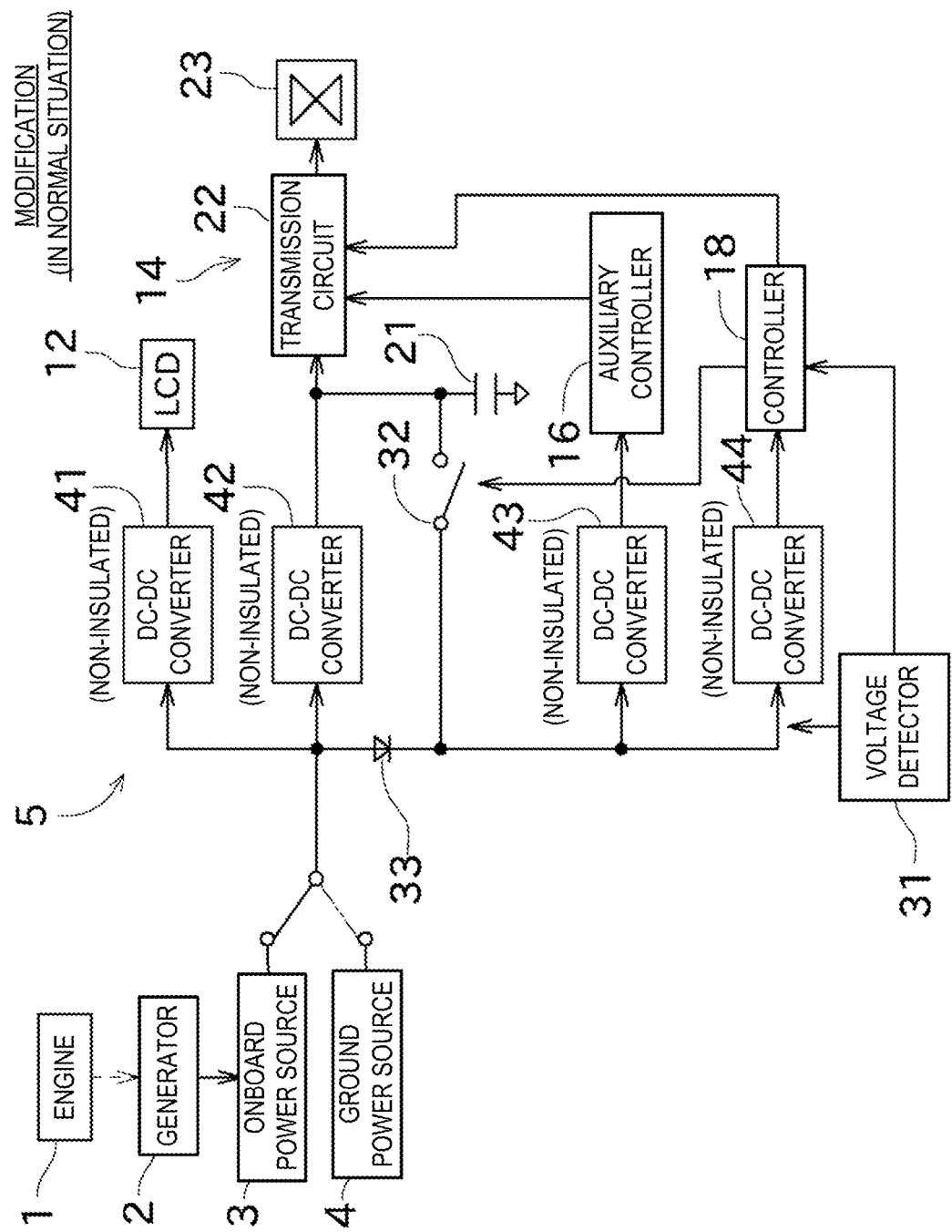
FIG. 7 is a block diagram illustrating a power source configuration inside a ship (in the normal situation) according to a modification of the embodiment.

Next, a modification of this embodiment is described. Note that, in the following description of this modification, the components similar to or same as those in this embodiment described above are denoted with the same reference numerals as the embodiment and the description thereof may be omitted. FIG. 7 is a block diagram illustrating a power source configuration inside a ship (in the normal situation) of this modification.

In this embodiment, the insulated DC-to-DC converter 11 is connected with the power source and the non-insulated DC-to-DC converters 13, 15 and 17 are disposed on the output side of the insulated DC-to-DC converter 11. On the other hand, in this modification, non-insulated DC-to-DC converters 41, 42, 43 and 44 are disposed for respective components, on the downstream side of the power source.

Moreover, in this embodiment, the voltage detector 31 has the function to detect the voltage value and the function to change the state of the switch 32 based on the voltage value and the threshold. On the other hand, the voltage detector 31 of this modification only has the function to detect the voltage value, and the detected voltage value is outputted to the controller 18. Further, the controller 18 has a function to change the state of the switch 32 based on the voltage value and the threshold.

As above, the DC-to-DC converters to be disposed in the fish finder 5 may be insulated or not insulated.

Although the preferred embodiment of this disclosure and the modification are described above, the above configurations may be modified as follows.

The instantaneous voltage drop includes a case of instantaneous blackout in which the value of the voltage to be supplied becomes zero for a short period of time, and a case where the value of the voltage to be supplied becomes a small value for a short period of time. Obviously, even in the case where the value of the voltage becomes zero for a short period of time, the fish finder 5 of either one of the embodiment and the modification can similarly prevent the controller 18 and the like from being turned off.

In the above description, the transmission capacitor 21 does not apply the voltage to the LCD 12 at all during the instantaneous voltage drop, the voltage may similarly be applied to the LCD 12. In this case, for example, by lowering the luminance of the LCD 12, the electric power to be consumed by the LCD 12 can be suppressed.

Alternative to the switch 32, a DC-to-DC converter may be used. Moreover, a function to increase and reduce the voltage may be provided to the DC-to-DC converter connected with the transmission capacitor 21. In this case, the switch 32 may be omitted.

The target of applying the voltage during the instantaneous voltage drop is preferably a component with an OS installed therein (component that requires a long period of time to activate). Moreover, during the instantaneous voltage drop, the voltage can be applied to other than the auxiliary controller 16 and the controller 18; however, it is preferable that the voltage is not applied to a component that does not require a long period of time to activate and a component that is not required to activate instantly.

The location in the circuit at which the voltage detector 31 detects the voltage value is arbitrary as long as the instantaneous voltage drop can be detected. Therefore, for example, the voltage value may be detected between the power source and the DC-to-DC converter 11. Note that, this disclosure may be applied to a configuration including AC-to-DC converter(s), alternative to the DC-to-DC converters described above.

In the above description, the example in which this disclosure is applied to the fish finder 5 is described; however, it may be applied to other ship electronic devices, such as a sonar that transmits ultrasonic waves to the surroundings of a ship to detect objects in the surroundings of the ship, a radar apparatus that transmits electromagnetic waves outside and detects objects in the surroundings thereof, or a wireless device.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A voltage drop protection apparatus which operates when an instantaneous voltage drop occurs when switching from a power source to another power source, comprising:
   an onboard power source in a ship;
   a switch configured to switch between a state in which the onboard power source supplies power to a marine electronic device and a state in which a ground power source on land supplies power to the marine electronic device;

a controller electrically connected with one of the onboard power source and the ground power source via the switch and configured to control the marine electronic device by using a power supplied from one of the onboard power source and the ground power source;

a transmission capacitor electrically connected with one of the onboard power source and the ground power source via the switch and configured to accumulate a transmission power to be used when transmitting either one of an electromagnetic wave and a sound wave; and a voltage detector configured to detect a value of voltage applied from one of the onboard power source and the ground power source via the switch toward the marine electronic device, wherein, as an instantaneous voltage drop occurs when switching between the onboard power source and the ground power source, when the voltage value detected by the voltage detector is lower than a predetermined threshold, the transmission capacitor applies a voltage at least to the controller.

2. The voltage drop protection apparatus of claim 1, wherein the controller is installed with an operating system.

3. The voltage drop protection apparatus of claim 1, wherein one of the onboard power source and the ground power source also supplies the power to a display unit configured to display an image, and wherein when the voltage value detected by the voltage detector is lower than the predetermined threshold, the transmission capacitor does not apply the voltage to the display unit.

4. The voltage drop protection apparatus of claim 1, wherein after the voltage value lower than the predetermined threshold is detected by the voltage detector, when the voltage value is detected by the voltage detector again and the detected voltage value is higher than the predetermined threshold, the application of the voltage from the transmission capacitor to the controller is stopped.

5. The voltage drop protection apparatus of claim 2, wherein one of the onboard power source and the ground power source also supplies the power to a display unit configured to display an image, and wherein when the voltage value detected by the voltage detector is lower than the predetermined threshold, the transmission capacitor does not apply the voltage to the display unit.

6. The voltage drop protection apparatus of claim 2, wherein after the voltage value lower than the predetermined threshold is detected by the voltage detector, when the voltage value is detected by the voltage detector again and the detected voltage value is higher than the predetermined threshold, the application of the voltage from the transmission capacitor to the controller is stopped.

7. The voltage drop protection apparatus of claim 3, wherein after the voltage value lower than the predetermined threshold is detected by the voltage detector, when the voltage value is detected by the voltage detector again and the detected voltage value is higher than the predetermined threshold, the application of the voltage from the transmission capacitor to the controller is stopped.

8. A transmission device, comprising:

a switch configured to switch between a state in which an onboard power source in a ship supplies power to a marine electronic device and a state in which a ground power source on land supplies power to the marine electronic device;

a transmitter configured to transmit either one of an electromagnetic wave and a sound wave outside and including a transmission capacitor electrically connected with one of the onboard power source and the ground power source via the switch;

a controller electrically connected with one of the onboard power source and the ground power source via the switch and configured to control at least the transmitter by using power supplied from one of the onboard power source and the ground power source; and a voltage detector configured to detect a value of voltage applied from one of the onboard power source and the ground power source via the switch toward the marine electronic device, wherein, as an instantaneous voltage drop occurs when switching between the onboard power source and the ground power source, when the voltage value detected by the voltage detector is lower than a predetermined threshold, the transmission capacitor applies a voltage to the controller.

9. The transmission device of claim 8, further comprising:

an insulated DC-to-DC converter electrically connected with one of the onboard power source and the ground power source; and a non-insulated DC-to-DC converter electrically connected with the controller.

10. A voltage drop protection system, comprising:

an onboard power source in a ship;

a ground power source on land; and a fish finder, including:
  a switch configured to switch between a state in which the onboard power source supplies power to the fish finder and a state in which the ground power source supplies power to the fish finder;
  a transmitter configured to transmit a sound wave underwater and including a transmission capacitor electrically connected with one of the onboard power source and the ground power source via the switch;
  a controller electrically connected with one of the onboard power source and the ground power source via the switch and configured to control at least the transmitter by using power supplied from one of the onboard power source and the ground power source; and
  a voltage detector configured to detect a value of voltage applied from one of the onboard power source and the ground power source to the fish finder, wherein, as an instantaneous voltage drop occurs when switching between the onboard power source and the ground power source, when the voltage value detected by the voltage detector is lower than a predetermined threshold, the transmission capacitor applies a voltage to the controller.

* * * * *